United States Patent [19]

LaPolla et al.

[11] 4,018,681

[45] Apr. 19, 1977

[54] FILTRATION OF CELLULOSIC SOLUTIONS

[75] Inventors: Edmund M. LaPolla, Parsippany; Charles F. Murphy, Morristown; Arthur Sarkisian, Cranford, all of N.J.

[73] Assignee: International Telephone and Telegraph Corporation, New York, N.Y.

[22] Filed: Nov. 12, 1975

[21] Appl. No.: 631,370

Related U.S. Application Data

[63] Continuation of Ser. No. 297,406, Oct. 13, 1972, abandoned.

[52] U.S. Cl. .................................. 210/66; 210/81; 264/196

[51] Int. Cl.$^2$ ........................................ B01D 37/00

[58] Field of Search ................... 210/66, 79–82, 210/67, 60, 59; 264/39, 169, 188, 187, 170, 196; 260/217, 218

[56] References Cited

UNITED STATES PATENTS

| | | | |
|---|---|---|---|
| 1,852,466 | 4/1932 | McConnell | 260/218 |
| 1,952,604 | 3/1934 | Parker | 264/170 |
| 2,956,682 | 10/1960 | Stephan | 210/82 |
| 3,393,262 | 7/1968 | Durso et al. | 264/188 |

Primary Examiner—Frank A. Spear, Jr.
Assistant Examiner—Benoit Castel
Attorney, Agent, or Firm—J. B. Raden; H. J. Holt

[57] ABSTRACT

Cellulosic solutions are filtered by a process enabling virtual complete recovery and recycling of the undissolved cellulosic components of the solutions. The process comprises filtering the solution through a bed of particulate material until the build-up of undissolved material impedes the further flow of solution through the bed, mixing the undissolved material and particulate bed with a solvent to partially dissolve the undissolved material, which is highly concentrated relative to its original concentration before filtration, adding a solubilizing reactant to said concentrated partial solution of undissolved material to complete the solution of the cellulosic residues, and separating and recycling the resulting solution.

10 Claims, No Drawings

FILTRATION OF CELLULOSIC SOLUTIONS

This is a continuation of application Ser. No. 297,406, filed Oct. 31, 1972, now abandoned.

This invention relates to a process of filtering cellulosic solutions, and, in particular, to a continuous process for the removal and recycling of undissolved cellulosic gels and fiber fragments from cellulosic solutions.

Prior to the extrusion of viscose into fibers or films, the viscose must be filtered to remove gels, fiber fragments and other undissolved materials to enhance the strength, smoothness and appearance of the final regenerated cellulose product and to prevent clogging of the extrusion orifices. The filtration step is one of the more serious bottlenecks in viscose processing. The filtration is normally done by batch filtration operations. After the filter - usually cotton batting, nylon or other synthetic felts, or various nonwoven fabrics — becomes clogged, the undissolved materials are normally discarded along with the filter medium, or backwashed from the medium and discarded, prior to its reuse. The difficulty in making the process continuous and in recycling the undissolved materials has been the absence of an effective means of separating the gummy undissolved materials from the filtrate and of an economic means of dissolving the gels and fiber fragments. The problem is particularly great because even very small proportions of undissolved residues cannot be tolerated in the extrusion of viscose fibers and films.

Filtration by means of a particulate bed is well known as the back washing to remove solid or gel residues from a plugged filter medium. However, such systems have never been economically applied to the full recovery and recycling of the cellulosic residues resulting from cellulose filtration. Other systems in use are relatively costly or do not provide for recovery of all of the cellulosic values that are filtered off.

It is accordingly an object of the present invention to provide a simple, economical, yet highly efficient, method of filtering cellulosic solutions.

It is an additional object of the present invention to provide a process for filtering cellulosic solutions which permits recovery and use of substantially all of the undissolved cellulosic materials which are normally discarded and which constitute an increasingly more difficult waste disposal problem.

It is still an additional object of this invention to provide a continuous or near continuous process for the filtration, recovery and recycling a undissolved cellulosic materials in a viscose filtration process.

These and other objects of the invention are achieved by a process which involves as its essential elements the effective separation of the undissolved materials from the cellulosic solution by filtration and the forced solution of a concentrated form of the undissolved cellulosic components with a solubilizing reactant. Separation of the undissolved cellulosic materials is effected by a particulate or powder bed which, as will be explained below, has been found to be uniquely suitable for the present process. Forced solution of the undissolved cellulosic components is then accomplished by use of what would otherwise be a prohibitively uneconomic amount of a solubilizing reactant on a highly concentrated form of the cellulosic residue.

More specifically, the process comprises the steps of filtering a cellulosic solution through a bed of particulated material, which is inert to the cellulosic solution, mixing the particulate bed and the undissolved material with a solvent therefor to partially dissolve the undissolved material, the partial solution of said undissolved material being highly concentrated relative to its concentration in the original cellulosic solution, adding a solubilizing reactant to said concentrated solution to complete the solution of the undissolved material, and recovering the reactant containing solution of cellulosic material. This solution may then be recycled to unfiltered cellulosic solution so that the waste stream occurring in conventional processes is eliminated.

The invention is particularly applicable to the industrial filtration of viscose and, for clarity, will be described with reference to the filtration of viscose solution. It should be understood, however, that the invention is applicable to cellulosic solutions generally, including in addition to viscose, cellulose acetate, hydroxyethyl cellulose, hydroxypropyl cellulose and the like.

The manufacture of viscose involves the conversion of cellulose into cellulose xanthate by reaction with carbon bisulfide following treatment with an alkaline solution, and then by dissolving the xanthate in a dilute alkaline solution, normally sodium hydroxide. The present filtration process involves utilization of this reaction in that carbon bisulfide is used as the solubilizing reactant and a dilute alkaline solution is used as the solvent to completely solubilize the undissolved cellulosic components of the viscose solution. The use of sufficient carbon bisulfide for this purpose on the total viscose solution would be far too costly to be commercially practical. However, the carbon bisulfide is used in the present process only on the small fraction of resistant gels and fibers which have been efficiently concentrated in a small volume. The carbon bisulfide is acting upon less than one percent, normally on the order of 0.1% to 0.2%, of the cellulose in the original solution. The amount of $CS_2$ necessary for solubilizing the cellulosic residues, based on this concentrated form of precipitate, is in fact, a small amount relative to overall processing quantities. Moreover, recycling of this small amount of $CS_2$ as part of the makeup solution for the next large viscose filtration results in almost no net increase in cost of raw materials.

The reactants and solvents used to complete solubilization of the cellulosic residues are either those normally used in preparing the particular cellulose derivative or reactants and solvents which are compatible with a makeup solution of unfiltered cellulosic solution so that the solubilized cellulosic components may be recycled and used in a continuous, or near continuous, filtration process. In the case of cellulose acetate, the solvent is 75% to 90% acetic acid solution is place of a sodium hydroxide solution, and the reactant for solubilizing the cellulosic residue is acetic anhydride, in an amount from 175% to 250%, based on weight of reactable cellulose. For hydroxyethyl cellulose, the solvent would be dilute alkaline sodium hydroxide as with viscose, but in this case, the reactant is ethylene oxide, at 20–70% by weight on cellulose. For hydroxypropyl cellulose, the solvent would also be dilute alkaline sodium hydroxide, but in this case the reactant is propylene oxide, at 25% to 75% by weight on cellulose.

The particulate bed and build-up of undissolved cellulosic material may first be washed with the solvent to partially dissolve the undissolved cellulose, and the wash liquor then treated with the solubilizing reactant to complete solubilization, or the solvent and reactant may be added at the same time. In the case of viscose solution, forced solution of undissolved cellulosic gels, fibers and fragments may be completed with as little as 50% by weight of $CS_2$, based on the weight of the cellulosic residues. Normally, however, an excess of the $CS_2$ should be used, based on the weight of cellulosic residue and frequently more than twice the weight of cellulosic residue will be used. The upper limit is not critical as long as all undissolved cellulose is dissolved. Again, it should be noted that such an amount of $CS_2$ is not, in fact, large or uneconomical because it is acting on a highly concentrated form of the cellulosic residue relative to the concentration of the original solution and, moreover, may be entirely recycled in the process.

The particulate bed may, but need not be, fully plugged before it is mixed with the alkaline solution or other solvent. The filtrate may be stopped when the filtration rate drops off to an extent indicating that some, or perhaps significant plugging has occurred. The language "impeding the further flow of liquid" as used herein, is intended to describe all such degrees of reduction of filtration rate, whether it be partial, significant or complete plugging of the particulate bed.

The use of particulate beds for filtration is, of course, known. They have been found to perform, however, a unique function in the present process. They plug, or otherwise impede the flow of liquid, far less rapidly than porous plates, screens or other filters used for conventional cellulosic filtration. An explanation for this is believed to reside in the manner in which cellulosic fibers and gels dissolve. To dissolve a properly xanthated cellulose fiber in a caustic solution, both time and agitation are needed. As the solvent wets the xanthated fiber, a concentrated, high viscosity solution layer is formed encasing the fiber. Agitation helps scrape off this thick layer into the surrounding liquid phase, further diluting it to the ultimate average viscosity; and at the same time, new surfaces of the reacted fiber are exposed to solvent. Without agitation, the gummy casing around individual fibers becomes so viscous that further penetration by solvent is impeded and masses of fairly stable swollen gels result.

In the particulate bed, a gummy gel fragment can be trapped in a cavity but still partly exposed to flowing solution. If it has been properly reacted, the gel which is being "scraped" by flowing solution can ultimately dissolve. However, improperly reacted or otherwise damaged fibers will finally plug all available spaces in the bed.

In addition, the use of particulate beds facilitates separation of the cellulosic residues for the dissolving step which follows. Porous plates and screens cannot be easily washed free after becoming plugged. On the other hand, the undissolved cellulosic residues may be removed from a particulate bed quite readily with dilute alkaline solution or other solvent. The particulate bed may be virtually any material in particulate or powder form suited to the corrosive nature of the system being filtered, alkaline in the case of viscose, acidic or neutral in the case of the various other cellulose derivatives. A particularly suitable bed for viscose solutions is one of powdered stainless steel, although other powdered metals may be used such as nickel, carbon steel, and other metals and alloys inert to and unreactive with the cellulosic solution. Organic polymers such as polyethylene, polypropylene, polyvinylchloride and Teflon (trademark for polytetrafluoroethylene) are also useful. Ceramic powder and other inert particulate materials will readily occur to those skilled in the art. Mesh size of powders will generally range from −20 to +325, U.S. standard mesh size.

The following is a more specific description of the invention as applied to the filtration of viscose.

The viscose solution is pumped through a bed of particulate material, normally under pressure ranging from 25 to 150 pounds per square inch gauge, but in some special cases under pressures up to 400 psig. After a certain amount of the solution has passed through the filter, the relatively small fraction of incompletely dissolved cellulosic fibers and gels will partially or completely plug the powder bed until the bed will assume the structure of almost a solid cake, thus preventing further flow of solution. In a typical case, over 200 liters of viscous solution will pass through 0.3 liters of graded −20 to +70 mesh stainless steel powder, 1¾ inch deep, before substantial plugging occurs. The bed may then be removed and washed while stirred or agitated with about ½ liter of 9% NaOH solution which partially dissolves the undissolved cellulosic materials and separates the embedded gels and fibers. The remaining undissolved material becomes visible as turbidity which floats to the top of the wash-solution and stainless steel powder bed. The solution may then be decanted and treated with an excess of carbon bisulfide, for example, 1 mililiter per 20 mililiters of the 9% NaOH wash solution, while the solution is agitated to force the remaining cellulosic residues into solution.

Alternatively, and preferably, the carbon bisulfide is added to the alkaline solution and the combined solution is added to the plugged, or partially plugged, bed as a single step while the bed remains in place. The turbidity which forms will be seen to clarify as the bed and solution are agitated and the cellulosic residues dissolve in the reactive, low viscosity medium. The wash solution, containing dissolved cellulosic residues, 9% NaOH solution and $CS_2$, is then decanted from the stainless steel bed and recycled as part of the makeup solution for the next 200 liters of viscose solution to be filtered. The powder bed may be reused for the next filtration cycle.

The original, unfiltered cellulosic solution contains a very small weight fraction of undissolved material. In a typical unfiltered viscose solution containing 9% regenerable cellulose, 0.1 to 0.2% of the cellulose is undissolved. After collection of the undissolved residue, it is partially dissolved in dilute alkaline solution in much higher concentration than the original solution by a factor of some 25 to 200 times. The weight of dilute alkaline solution is about 0.5 to 4%, and usually about 1%, of the weight of the original solution. In terms of volume, the dilute alkaline solution is about twice the small volume of the plugged filter bed. The dilute alkaline solution should have a concentration of from 7% to 11% by weight of alkali metal hydroxides. The particular choice of alkali or base is not critical, although NaOH will normally be used because it is widely used in viscose processing. However, other basic materials such as lithium or potassium hydroxide may be used and the particular choice of base will readily occur to those skilled in the art.

Periodically, magnetic or gravity separation may be used to purge the metal powder of silica and other noncellulosic contaminants which otherwise build up in the powder bed. Occasional metal particles which escape from the powder bed in the exiting filtered solution may also be trapped with a magnetic device, thus assuring 100% retention of the bed.

In a particularly preferred form of the invention, the filtration is carried out through a particulate bed having a coarse layer and then a fine layer (or though two separate beds, one coarse and the other fine). Viscose solutions filtered through such a dual-size powder bed produced filtered solutions and spun rayon of excellent quality. The first, or normally upper portion of the bed may, for example, have a mesh size from −20 to +40, and the second, finer layer may have a mesh size ranging from −40 to +70. By using powders of differing magnetic properties, or different specific gravities, a layer of coarse particles can be placed above a fine layer to create the dual-size powder bed.

The following examples illustrate the practice of the invention. All parts are by weight, unless otherwise indicated and all mesh sizes are U.S. standard.

EXAMPLE 1

A stainless steel powder bed was prepared of 1¾ inch depth and five inches diameter. The bottom one inch of the bed was of −40 to +70 U.S. standard mesh size. The top ¾ inch of the bed was −20 to +40 mesh size stainless steel powder. The filtration was carried out in a sealed pressure vessel using compressed air at 40 psig to maintain a constant feed pressure. The viscose solution had a composition of 9% regenerable cellulose (based on total solution), 6.0% NaOH (based on total solution) and 28% $CS_2$ (based on cellulose content of solution). After 235 kilograms of viscose solution passed through the system with only partial plugging (i.e. the filtration rate had dropped about 10 to 30%), the bed was digested in about one liter of 9.0% NaOH containing a $CS_2$ addition of 5.0 cc per 100 cc of NaOH solution amounting to about 250% $CS_2$ based on the estimated amount of undissolved cellulose trapped in the bed. After a one-hour treatment, the digestion liquor was decanted from the bed and used as part of the make-up caustic for the next batch of viscose to be filtered through the same stainless steel bed. After decantation, the bed was remounted and prepared for reuse. The cycle was repeated four times, each filtration cycle consisting of two batches totaling 200 to 240 kgs. (190 to 227 liters) of viscose. The second and fourth cycles used 2 kgs. of digested washings from the previous cycle.

In order to determine plugging values, separate, but identical, solutions were filtered through a stainless steel bed and through a standard viscose filter medium of one layer of double faced 2 ounce cotton and one supporting layer of 6 ounces canton flannel. The filtered solutions were then refiltered through the standard medium until plugging of the filter occurred. The plugging values obtained for the particulate bed filtration were at least equal to, and generally better than, the conventional filter medium. Moreover, filtration efficiency was not decreased as a result of the recycle procedure of reusing the particulate bed or of reclaiming the undissolved cellulosic particles and introducing them back into the viscose stream as part of the make-up caustic.

EXAMPLE 2

The ultimate test of filtration quality is its effect on the spinning of viscose fibers. A series of 4-liter pots of viscose was taken from a single 30-gallon batch and each was processed with a different filtration method, i.e., one was filtered through nylon felt/cotton batting/cotton flannel, another through cotton batting/cotton flannel, and a third was filtered through a powdered stainless steel bed of −40 to +70 mesh as in Example 1. In each case, the viscose solution had a composition of a type used for tire yarn — 7% regenerable cellulose (on total solution), 6% NaOH (on total solution) and 34% $CS_2$ (on cellulose). The results indicated that the fatigue life, cord strength and iron pick-up of the sample filtered through the stainless steel bed, in accordance with Example 1, were equal to or better than that of control samples filtered in conventional fashion nylon felt/cotton batting/cotton flannel or cotton batting/cotton flannel. And, of course, such results were achieved with substantially no waste effluent.

It has been found that the process of the present invention, utilizing a stainless steel powder bed of 5 inches diameter and 1¾ inch depth, achieves an average flow rate at 40 psig operating pressure of 19.2 gallons/ft.$^2$/hour. This flow rate is over four times the flow rate through conventional viscose filter presses (2.2–4.4 gallons/ft.$^2$/hour as reported in the literature) for operating pressures several times greater — 100–150 psig.

The present process thus provides a number of advantages over conventional filtration processes including longer operating cycles - less maintenance and shut-down time, avoidance of pollution by recovery of entrapped viscose and undissolved gels and capability of full automation of the filtration bed thus eliminating filter disposal and reducing cost of maintenance of filter media. It also makes possible the potential use of economical pulp grades in compositions which cannot be tolerated by conventional filter systems.

We claim:
1. A process for the filtration of viscose cellulosic solutions containing less than 1% of undissolved cellulosic materials comprising
    filtering the cellulosic solution through a bed of particulate material inert to the cellulosic solution until the build-up of undissolved material in the bed impedes the further flow of solution through the bed,
    mixing the particulate bed and build-up of undissolved material with a sodium hydroxide solvent therefor substantially free of cellulosic material to partially dissolve undissolved cellulosic material, the partial solution of said undissolved cellulosic material being highly concentrated relative to its concentration in the original cellulosic solution, the concentration being at least 25 times the concentration of the original solution,
    adding carbon bisulfide substantially free of cellulosic material to said concentrated solution in an amount by weight in excess of the amount by weight of the undissolved material to complete the solution of the undissolved cellulosic material,
    separating the solution from the particulate bed, and
    recycling to unfiltered cellulosic solutions the reactant containing solution of cellulosic material.
2. The process of claim 1 in which the sodium hydrotide solvent and carbon bisulfide are added at the same time.
3. The process of claim 1 in which the particulate bed comprises two layers.
4. The process of claim 1 in which the mesh size of the particles in the bed range from −20 to +325.

5. The process of claim 1 in which the filtration is carried out under pressure of from 25 to 400 psig.

6. The process of claim 1 in which the particulate material of the bed is a metal.

7. The process of claim 6 in which any metal particles from the bed which remain in the cellulosic solution are removed magnetically.

8. The process of claim 6 in which the particulate material of the bed is stainless steel.

9. The process of claim 1 in which the particulate bed and build-up of undissolved material is mixed with from 0.5 to 4.0% by weight of dilute sodium hydroxide solution, based on the weight of the original cellulosic solution.

10. The process of claim 9 in which the dilute sodium hydroxide solution has a concentration of from 7 to 11% by weight.

* * * * *